United States Patent [19]

Woodling

[11] 3,710,826
[45] Jan. 16, 1973

[54] FLUID VALVE MEANS HAVING FEATHERING ACTION

[76] Inventor: George V. Woodling, 22077 West Lake Road, Rocky River, Ohio 44116

[22] Filed: Sept. 3, 1971

[21] Appl. No.: 177,554

[52] U.S. Cl............................................137/625.21
[51] Int. Cl..............................................F16k 11/02
[58] Field of Search ......418/61; 137/625.21, 625.22, 137/625.23, 625.24

[56] References Cited

UNITED STATES PATENTS 2,907,349  10/1959  White..............................137/625.23
3,552,891  1/1971  Woodling.....................137/625.21 X Primary Examiner—Henry T. Klinksick
Attorney—Woodling, Krost, Granger and Rust

[57] ABSTRACT

Fluid valve means having feathering action and comprising a plurality of annularly arranged fluid ports and a plurality of annularly arranged fluid conduction means relatively rotatably about an axis. Said fluid ports and said fluid conduction means respectively having opposite sides including substantially straight valve edges which angularly meet and cross each other at an acute crossing valve angle to provide for said feathering action upon relation rotatable movement therebetween.

10 Claims, 7 Drawing Figures

PATENTED JAN 16 1973 3,710,826
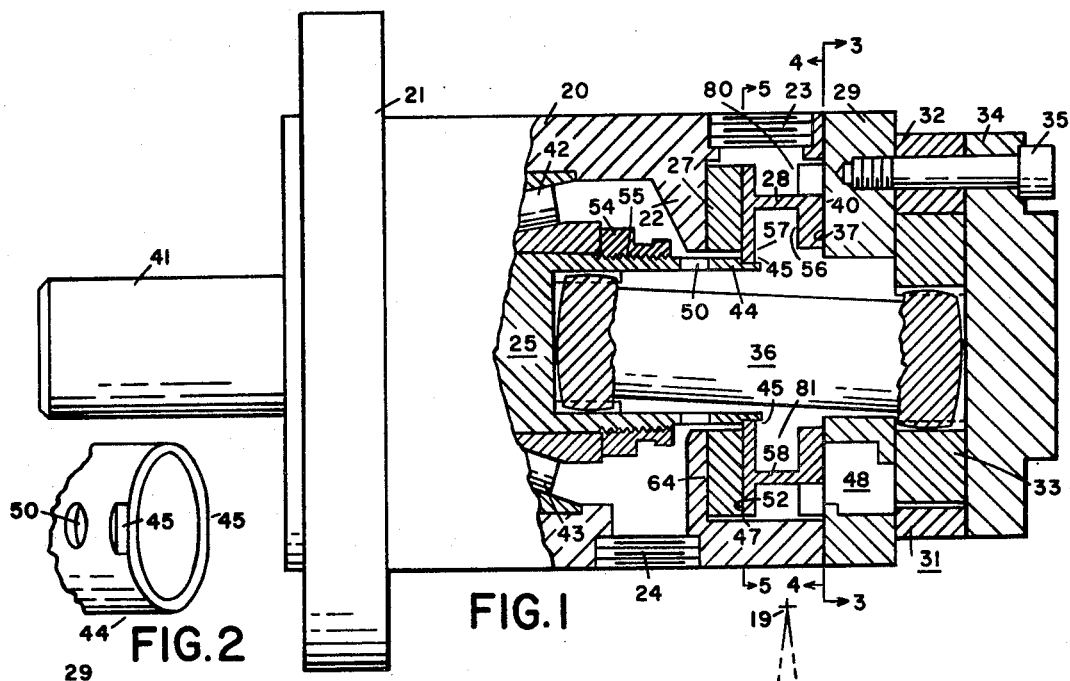
FIG.1
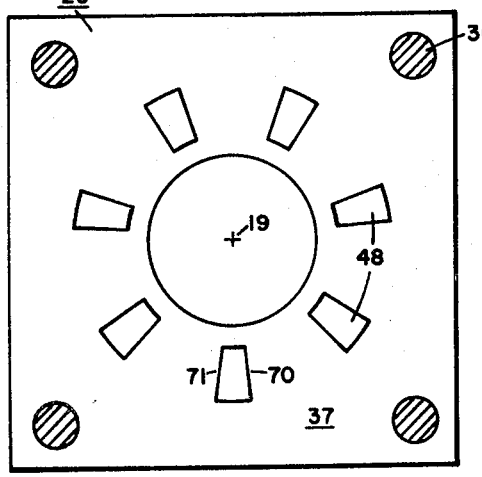
FIG.2
FIG.3
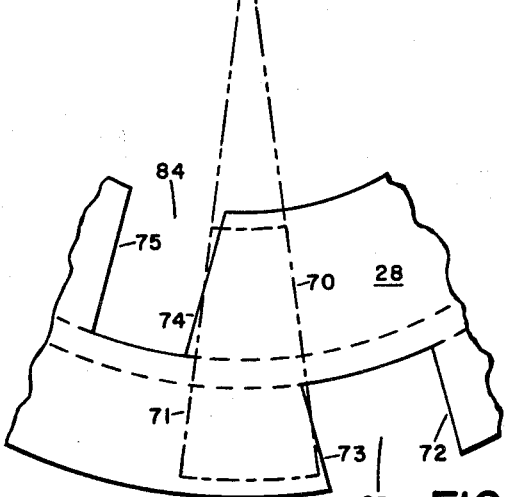
FIG.6
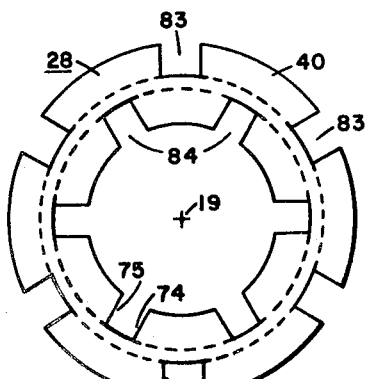
FIG.4 FIG.5
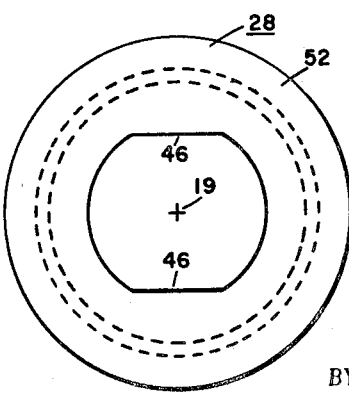
FIG.7
INVENTOR.
GEORGE V. WOODLING
BY
Woodling, Krost, Granger and Rust
attys 3,710,826

FLUID VALVE MEANS HAVING FEATHERING ACTION

BACKGROUND OF THE INVENTION

Relatively rotatable valve edges which have a sudden shear opening and a sudden shear closing create a fluid turbulence which is detrimental to smooth performance. The turbulence not only affects the valve action but also extends to the fluid pressure device being controlled by the valve. This is particularly true for a commutating valve which controls the flow of fluid to and from a stator-rotor mechanism.

Accordingly, it is an object of my invention to avoid a sudden shear opening and a sudden shear closing of a valve which controls the flow of fluid to and from a stator-rotor mechanism.

Another object is to provide a feathering action to the operation of a valve.

SUMMARY OF THE INVENTION

The invention constitutes fluid valve means having feathering valve edge means and comprising stationary valve means and rotary valve means relatively rotatable about an axis and respectively having stationary and rotary face well means slidably engaging each other in a plane, said stationary face wall means having a plurality of fluid ports therein, said fluid ports being disposed at spaced intervals around said axis in an annular direction and respectively having opposite sides including substantially straight stationary valve edge means extending in a direction transverse to said annular direction, said substantially straight stationary valve edge means converging in a direction looking towards said axis, said rotary face wall means having at least a first series of fluid conduction means therein, said first series of fluid conduction means respectively having opposite sides including substantially straight rotary valve edge means extending in a direction transverse to said annular direction, said substantially straight stationary valve edge means and said substantially straight rotary valve edge means constituting feathering valve edge means and angularly meeting and crossing each other at an acute valve angle upon relative movement of said stationary and rotary valve means.

BRIEF DESCRIPTION OF THE DRAWINGS

Other objects and a fuller understanding of this invention may be had by referring to the following description and claims, taken in conjunction with the accompanying drawings, in which:

FIG. 1 is a partial, elongated sectional view of fluid pressure device embodying the features of my invention;

FIG. 2 is a representation of a male shank provided on a terminal end portion of a hollow shaft adapted to slidably fit within a female socket in the rotary valve, the male shank being rotated 90° from the position shown in FIG. 1;

FIG. 3 is a view of the front side of the stationary valve, taken along the line 3—3 of FIG. 1;

FIG. 4 is a view of the front side of the rotary valve taken along the line 4—4 of FIG. 1;

FIG. 5 is a view of the back side of the rotary valve, taken along the line 5—5 of FIG. 1;

FIG. 6 is an enlarged, fragmentary representation of the rotary valve superimposed on the stationary valve and showing the angular relationship of the respective valve edges to provide for the feathering action; and FIG. 7 is a fragmentary view of the rotary valve and showing the valve edges of the inside fluid conduction means diverging in a direction looking towards the axis thereof.

DESCRIPTION OF THE PREFERRED EMBODIMENT

The fluid pressure device in which my invention may be incorporated may comprise a fluid motor or any other fluid device having a fluid valve.

With reference to the drawings, the fluid pressure device in which my invention may be incorporated comprises generally a main housing 20 having substantially a square cross-section. A mounting flange 21 may be secured to the left-hand end of the housing by means of suitable screws (not shown). The housing is hollow from end-to-end, and intermediate the ends of the housing there is provided an annular internal rim 22 which generally separates the hollow housing into a left-hand end compartment and a right-hand end compartment.

Rotatively mounted in the left-hand end compartment is a main load shaft 25 having an axis substantially coinciding with he longitudinal axis of the fluid pressure device. The main shaft 25 comprises an enlarged internal portion having a reduced external portion 41 extending axially outwardly of the main housing through the mounting flange 21. The enlarged internal portion of the main shaft is supported preferably by tapered roller bearings 42 and 43 which provide end thrust as well as radial thrust. A tightening nut 54 which threadably engages male threads 55 secures the bearings 42 and 43 against axial movement upon the main shaft. The tightening nut 54 may be provided with a built-in locking feature to prevent loosening.

On the right-hand end of the hollow housing 20, there is mounted a square stationary valve member 29 by means of screws 30. The stationary valve member 29 has a stationary valve face 37. The annular internal rim 22 has reaction wall means 64 facing the stationary valve face 37 and is axially spaced therefrom. Between the stationary valve face 37 and the reaction wall means 64, there are mounted rotary valve means 28 and bushing means 27. The rotary valve means 28 is adapted to be rotated relative to the stationary valve member 29 for controlling the entrance of fluid to and the exit of fluid from a stator-rotor mechanism 31 comprising a stator 32 and a rotor 33. An end cap 34 encloses the stator-rotor mechanism 31. The stator-rotor mechanism 31 and the end cap 34 are secured to the stationary valve member 29 by means of screws 35. Fluid is delivered to and from the housing 20 through a pair of fluid ports 23 and 24. An interconnecting shaft 36 interconnects the main shaft 25 and the rotor 33 of the stator-rotor mechanism 33 and is adapted to transmit torque therebetween.

The bearings 42 and 43 constitute common bearing means for the main shaft 25 and the rotary valve means 28. The common bearing means directly supports the main shaft 25 and indirectly supports the rotary valve means 28 through extension drive means comprising a hollow shaft 44 integrally connected to the main shaft 25. The hollow shaft 44 extends axially through the internal rim 22 into the right-hand end compartment and makes a driving connection with the rotary valve means 28 for driving same. The hollow shaft 44 terminates with a male shank 45 which slidably fits within a female socket 46 provided in the rotary valve means 28, see FIG. 5. The connection comprises a non-rotative connection and rotates the rotary valve means 28 upon rotation by the main shaft. This connection also provides slidable axial movement between the rotary valve means 28 and the hollow shaft 44 to accommodate for axial movement of the load shaft without interfering with the operation of the rotary valve means 28. The axial slidable movement which is permitted between the male shank 45 and the female socket 46 is greater than the maximum distance that the load shaft 25 may be moved in049an axial direction during operation. As illustrated in FIG. 1, the rotary valve means 28 and the right-hand housing compartment in which it is mounted has a radial clearance 47 therebetween to accommodate for radial movement of the main shaft 25 without interfering with the operation of the rotary valve means 25. The radial clearance 47 is greater than the maximum distance that the main shaft 25 may move in a radial direction during operation. The radial clearance 47 also extends between the bushing means 27 and the main housing.

The rotary valve means 28 is generally H-shaped in cross-section and comprises first and second opposite body sides or flanges 56 and 57 interconnected by an annular crossbar 58. The first flange 56 has a rotary valve face 40 (FIG. 4) which is constrained against the stationary valve face 37. The second flange 57 has engageable face wall means 52 which faces the reaction wall means 64. The bushing 27 is mounted between the engageable 9inface wall means 52 and the reaction wall means 64.

As illustrated in FIG. 1 the rotary valve means 28 and the bushing means 27 both have external wall means and internal wall means. The external wall means defines a first fluid chamber means 80 in constant fluid communication with the fluid port 23. The internal wall means defines a second fluid chamber means 81 in constant fluid communication with the fluid port 24 through openings 50 in the hollow shaft 44.

As shown, the fluid chamber means 80 and 81 are in valve communication with the stator-rotor mechanism. The valve communication to and from the first fluid chamber means 80 is provided through fluid conduction means 83 in the outer flange portion of the flange leg 56 of the rotary valve means. The valve communication to and from the second fluid chamber means 81 is provided through fluid conduction means 84 in the inner flange portion of the flange leg 56 of the rotary valve means. The fluid conduction means 83 and 84 are disposed to register, upon rotation of the rotary valve means, with a plurality of fluid openings or ports 48 provided in the stationary valve member 29 which communicate with the stator-rotor mechanism.

The operation of the rotary valve means 28 in commutation with the stationary valve member 29 is such that there is a first series of commutating fluid connections between the fluid port 24 and the stator-rotor mechanism and a second series of commutating fluid connections between the stator-rotor mechanism and the fluid port 23. The commutating valve action, and the flow of fluid between the fluid ports 23 and 24 and the stator-rotor mechanism is substantially the same as that shown and described in my U.S. Pat. No. 3,405,603.

As shown in FIGS. 3 and 6, the fluid openings or ports 48 in the face 37 of the stationary valve member 29 are disposed at spaced intervals in an annular direction around the longitudinal axis of the fluid pressure device, being indicated by the reference character 19 in FIGS. 3, 4 and 5. The fluid openings or ports 48 respectively have opposite sides including substantially straight stationary valve edges 70 and 71 extending in a direction transverse to said annular direction. The substantially straight stationary valve edges 70 and 71 converge in a direction looking towards the longitudinal axis 19. As illustrated, the included converging angle is approximately 15°. The fluid conduction means 83 and 84 in the rotary valve face 40 respectively have opposite sides including substantially straight rotary valve edges extending in a direction transverse to said annular direction. The straight rotary valve edges on opposite sides of the fluid conduction means 83 are substantially parallel and are identified by the reference characters 72 and 73 and the straight rotary valve edges on opposite sides of the fluid conduction means 84 are likewise parallel and are identified by the reference characters 74 and 75. The substantially straight stationary valve edges and the substantially straight rotary valve edges constitute feathering valve edge means and angularly meet and cross each other at an acute valve angle ranging from approximately 5° to 10° upon relative movement of said stationary and rotary valve means. A sudden shear opening and a sudden shear closing of the valve is thus avoided as would be the case if the straight valve edges crossed each other in substantially parallel alignment or at substantially a zero valve angle. The gradual opening and closing of the valve incident to the angularly crossing of the valve edges may be characterized as producing a feathering action. The flow of the fluid through the valve is smooth.

In FIG. 7, the inside fluid conduction means have substantially straight valve edges 76 and 77 which diverge in a direction looking towards the longitudinal axis 19. This construction has the effect of increasing the angular relationship between the crossing valve edges, wherein the crossing valve angle may be increased to approximately 15°.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Fluid valve means having feathering valve edge means and comprising stationary valve means and rotary valve means relatively rotatable about an axis and respectively having stationary and rotary face wall means slidably engaging each other in a plane, said stationary face wall means having a plurality of fluid ports therein, said fluid ports being disposed at spaced intervals around said axis in an annular direction and respectively having opposite sides including substantially straight stationary valve edge means extending in a direction transverse to said annular direction, said substantially straight stationary valve edge means converging in a direction looking towards said axis, said rotary face wall means having at least a first series of fluid conduction means therein, said first series of fluid conduction means respectively having opposite sides including substantially straight rotary valve edge means extending in a direction transverse to said annular direction, said substantially straight stationary valve edge means and said substantially straight rotary valve edge means constituting feathering valve edge means and angularly meeting and crossing each other at an acute valve angle upon relative movement of said stationary and rotary valve means.

2. The structure of claim 1, wherein said acute valve angle is less than 15°.

3. The structure of claim 1, wherein said substantially straight, rotary valve edge means on opposite sides of said first series of fluid conduction means are substantially parallel with each other.

4. The structure of claim 1, wherein said substantially straight rotary valve edge means on opposite sides of said first series of fluid conduction means diverge in a direction looking towards said axis.

5. The structure of claim 1, wherein said first series of fluid conduction means respectively have a closed outer end and an open inner end.

6. The structure of claim 1, wherein said rotary face wall means has a second series of fluid conduction means therein, said second series of fluid conduction being disposed farther way from said axis than said first series of fluid conduction means, said second series of fluid conduction means being disposed at annular intervals around said axis and respectively having opposite sides including substantially straight rotary valve edge means extending in a direction transverse to said annular direction, said substantially straight stationary valve edge means and said substantially straight rotary valve edge means on opposite sides of said second series of fluid conduction means also constituting feathering valve edge means and angularly meeting and crossing each other at an acute crossing valve angle upon relative movement of said stationary and rotary valve means.

7. The structure of claim 6, wherein said acute crossing valve angle is less than 15°.

8. The structure of claim 6, wherein said substantially straight rotary valve edge means on opposite sides of said second series of fluid conduction means are substantially parallel.

9. The structure of claim 6, wherein said first and second series of fluid conduction means are alternately disposed in an annular direction relative to each other.

10. The structure of claim 6, wherein said second series of fluid conduction means respectively have an open outer end and a closed inner end.

* * * * *